United States Patent [19]
Hershey et al.

[11] Patent Number: 4,655,338
[45] Date of Patent: Apr. 7, 1987

[54] BOTTLE UNSCRAMBLER

[75] Inventors: Jay P. Hershey, Kinzers; Michael A. Ruth, Glenmoore, both of Pa.

[73] Assignee: Omega Design Corporation, Lionville, Pa.

[21] Appl. No.: 548,108

[22] Filed: Nov. 2, 1983

[51] Int. Cl.⁴ .............................................. B65G 47/28
[52] U.S. Cl. ................................... 198/395; 198/394; 198/376
[58] Field of Search ............... 198/395, 394, 397, 396, 198/377, 376, 399, 375, 379; 134/22.18, 23, 152, 153

[56] References Cited

U.S. PATENT DOCUMENTS

| | | | |
|---|---|---|---|
| 2,693,872 | 11/1954 | Baader | 198/376 |
| 2,849,126 | 6/1979 | Humphrey et al. | 198/378 |

FOREIGN PATENT DOCUMENTS

| | | | |
|---|---|---|---|
| 1146674 | 11/1957 | France | 198/377 |
| 1264622 | 2/1972 | United Kingdom | 198/377 |
| 716779 | 2/1980 | U.S.S.R. | 198/377 |

*Primary Examiner*—Joseph E. Valenza
*Assistant Examiner*—Kyle E. Shane
*Attorney, Agent, or Firm*—Eugene Chovanes

[57] ABSTRACT

A bottle orienting device is disclosed in which bottles are fed into a first station randomly in either a top down or a bottom down condition, moving pockets pick up the individual bottles and transport them past a sensor which determines the particular condition thereof and responds with an appropriate signal when a predetermined condition is found, means are provided to rotate the pockets carrying the bottles so that all bottles have the same orientation condition, either top down or bottom down as desired, at this point bottle air cleaning means can be operatively provided, with all bottles being selectively first presented in a top down condition to the air cleaning device, means are then provided to reverse the condition of the bottles to the bottom down position, and then the bottles are discharged from the device, if air cleaning is not desired, the bottles found to be in the wrong orientation at the sensing station are rotated to present them bottom down to the discharge, of significance all bottles may be presented to the discharge in the top down or bottom down condition as desired to meet downstream requirements.

17 Claims, 15 Drawing Figures

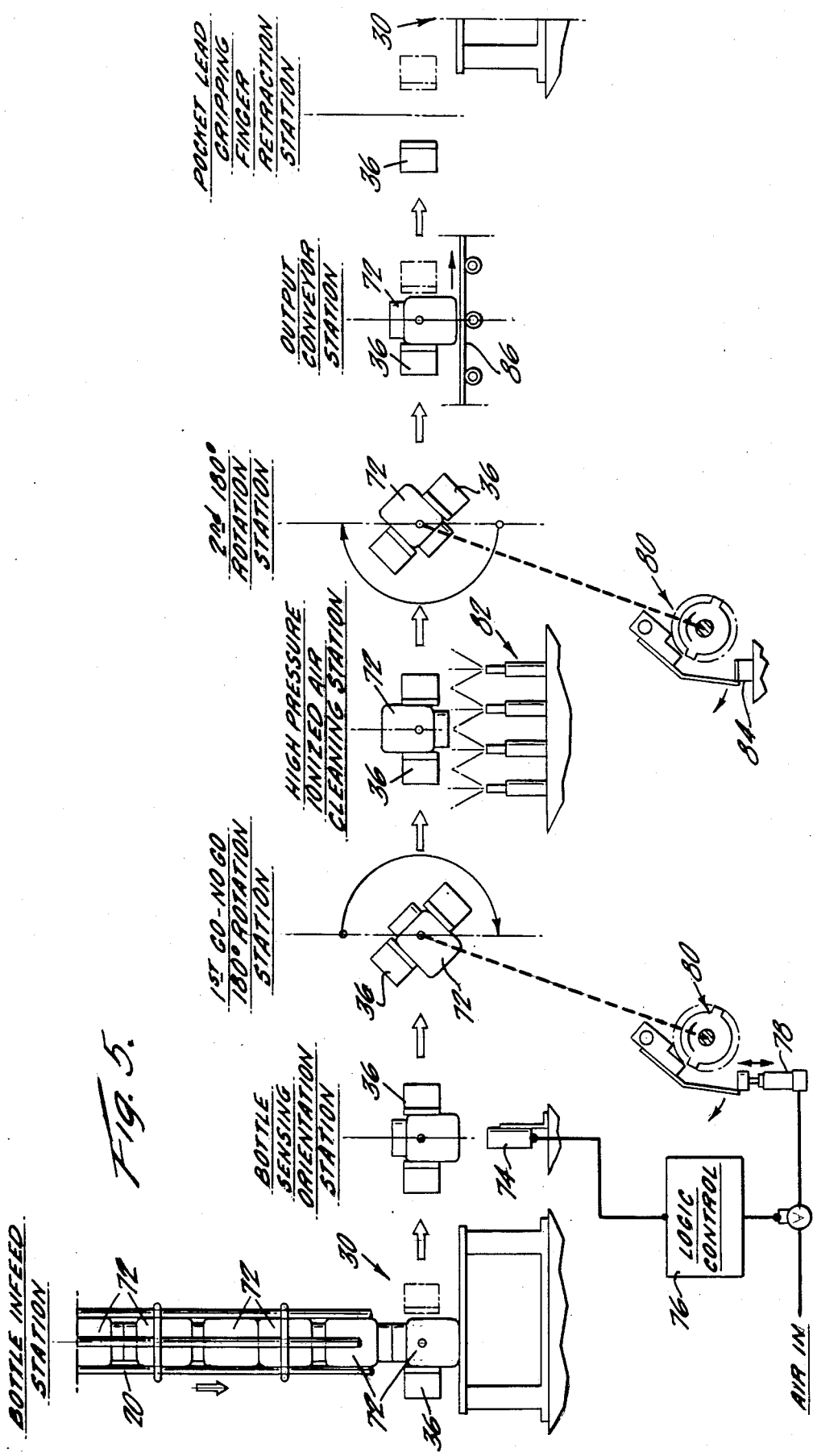

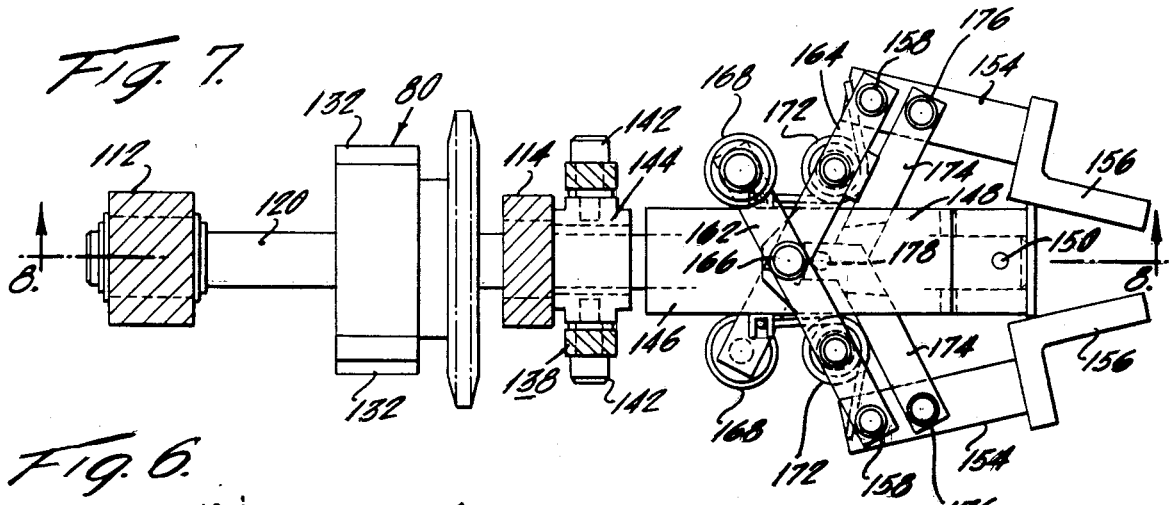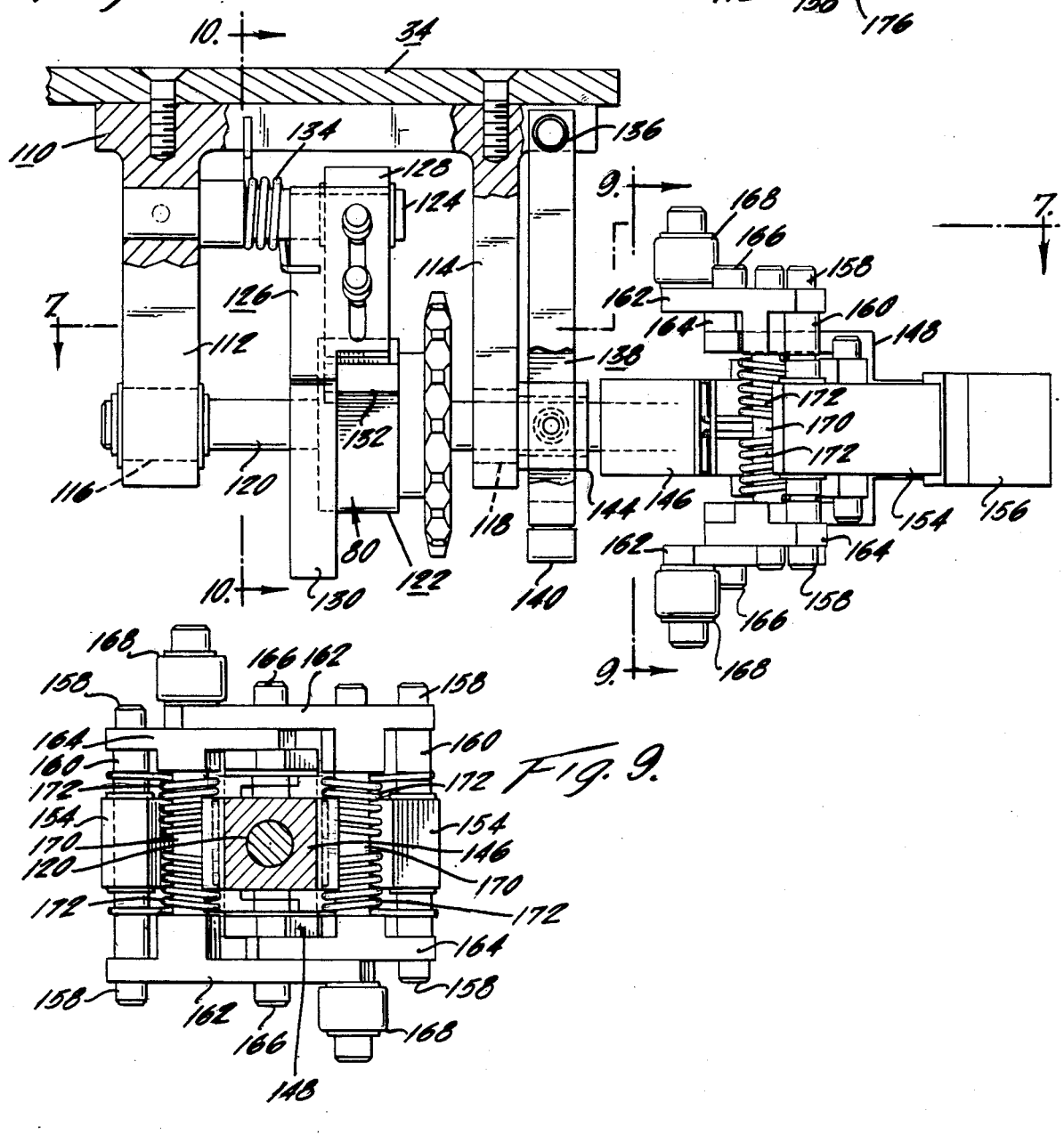

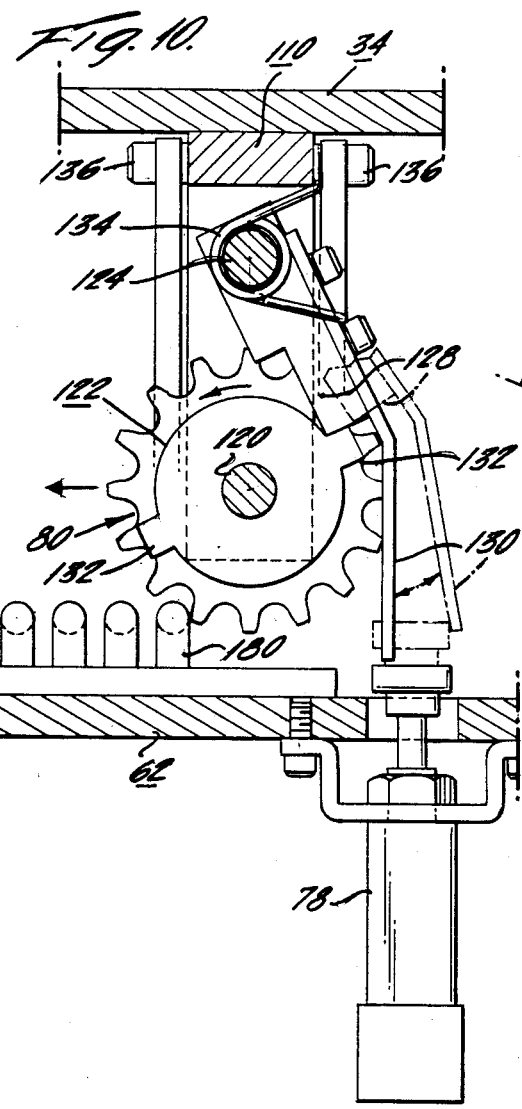
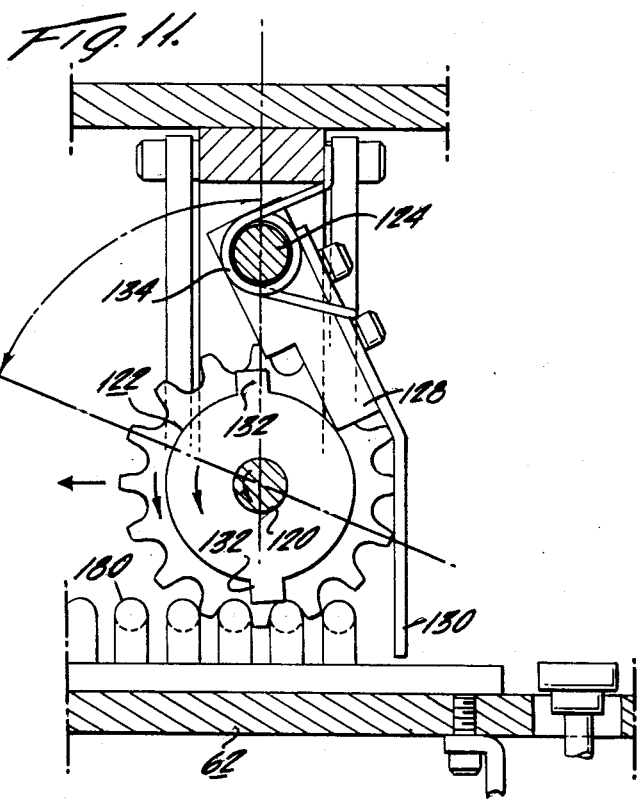
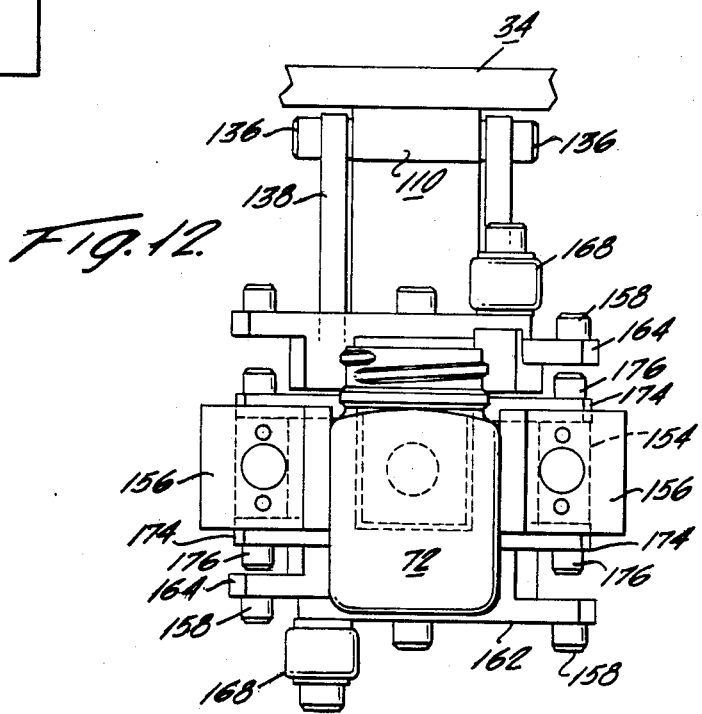

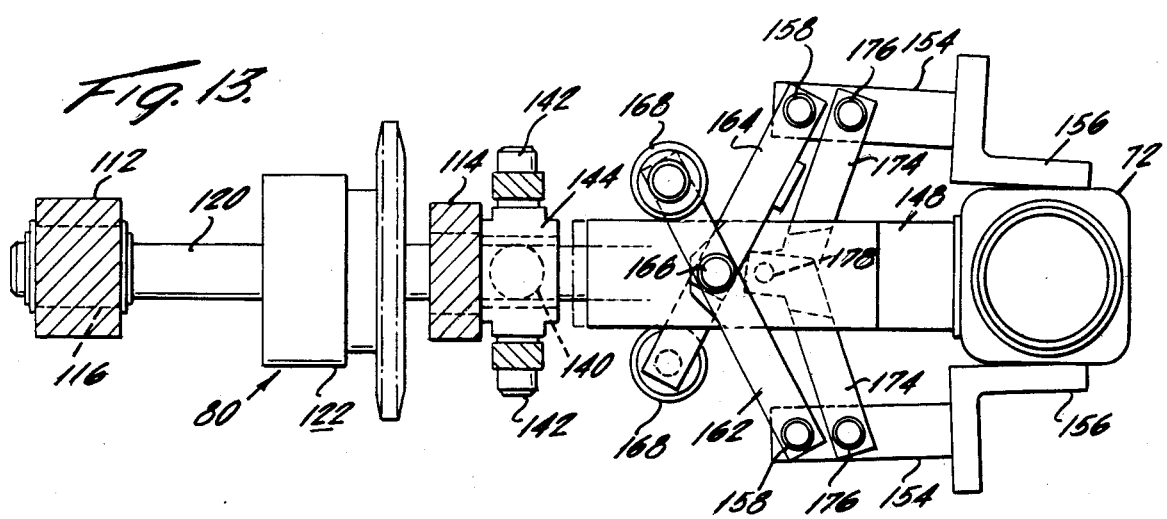
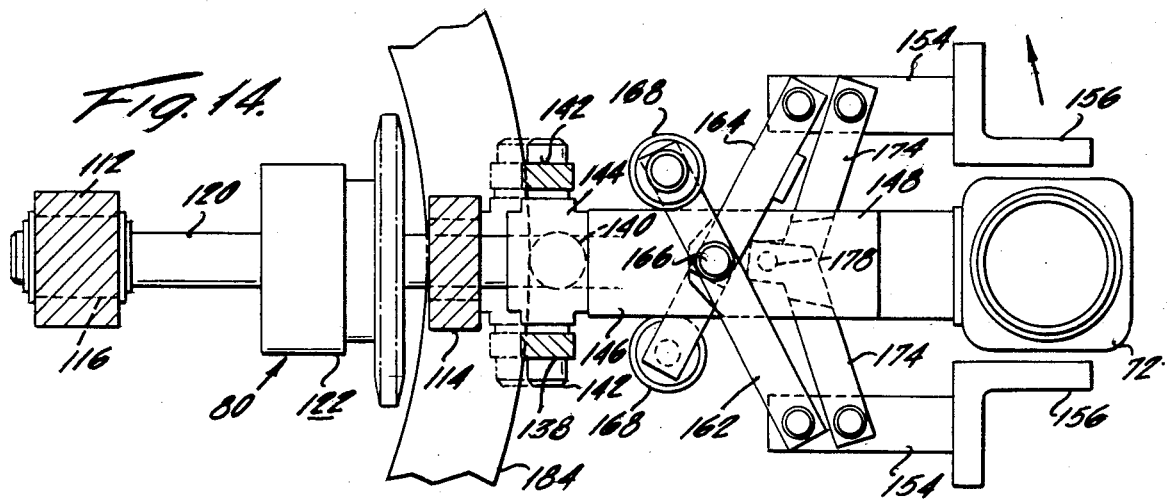
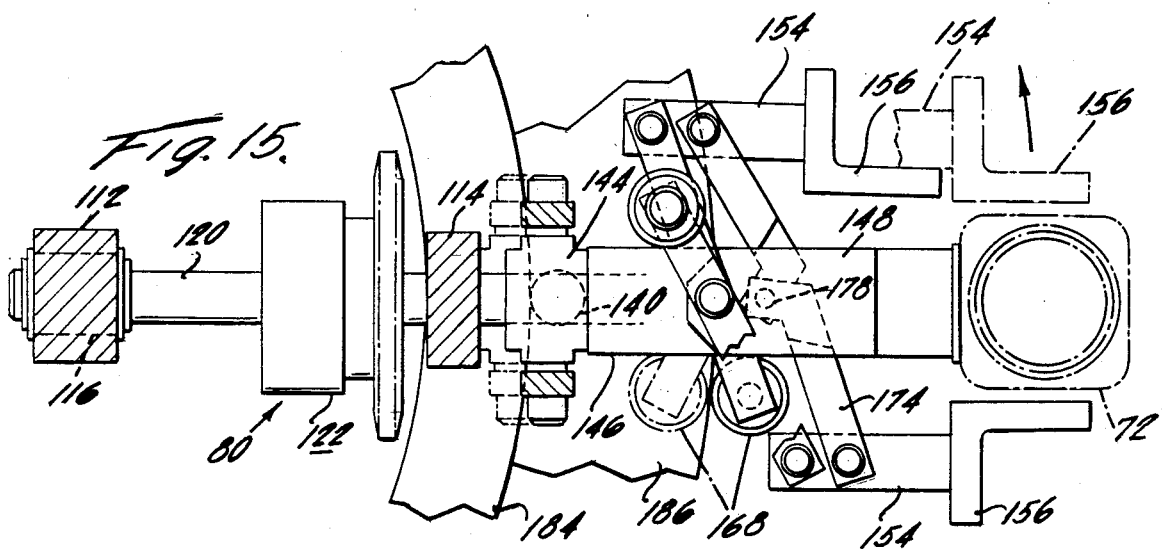

BOTTLE UNSCRAMBLER

BACKGROUND OF THE INVENTION

In the prior art various devices have been used to unscramble and orient bottles. Most of the devices have one or more drawbacks in their method of operation such as means of handling which results in marring or scuffing of bottles, lack of flexibility in design to allow rapid changeover from one size bottle to another, and the need for expensive and cumbersome change parts to handle various size bottles.

SUMMARY OF THE INVENTION

It has now been discovered that an improved bottle orienting device can be provided in which the above drawbacks and others can be obviated. The present invention relates to a bottle handling device which accepts randomly oriented bottles from a source, reorients the bottles to a common orientation condition, provides for a processing step such as cleaning, drying, or the like, and reorients them in a usual condition, such as for filling or labeling, etc.

In its broadest sense the invention includes a device having a feed means for delivering bottles of random orientation to a first station in whatever orientation. At the first station, the bottles are individually picked up by a bottle transport means, and are transported along a predetermined path. Sensor means along the path determine what condition the bottle is in, and selectively generate a signal when the bottle is in a preselected condition, such as for example a bottom down condition. No signal is generated when the bottle passing the sensor is in the other condition. A first rotating means is positioned next on the path, which changes the condition of the bottle about which a signal has been sent, and does not change the condition of the other bottles. Thus, after this point, all of the bottles are in the same condition, which would be either top down or bottom down for example.

In a preferred embodiment, an operational step can be performed on the bottles at this time, such as by way of example causing air or wash water to be directed into the bottles. Next the bottles are carried to a second rotation means which change the condition of all the bottles, whereby they would all be in a bottom down condition for filling or whatever. A second station is then provided in the path to take the bottle from the bottle transport means, and send them on for further processing and the like.

In a preferred embodiment, the bottle transport means includes a moveable drive means carrying a plurality of individual pocket means. These pocket means include carrying arms for carrying the bottle from the first station along the path, and condition holding means to hold the bottle in its condition unless operated on by the device to change the condition. The first rotation means includes a sensor signal responsive deactivation means which contacts the pocket means when it receives the selectively generated signal and deactivates the condition holding means during the rotation step. The rotation means includes means to contact the support for the carrying arms to reverse the condition of the bottle and reactivate the condition holding means. The second rotation means includes means to deactivate the holding means, and rotate the support arm holding the bottle to change the condition of all of the bottles.

In one particularly preferred embodiment, the device further includes means for adjusting the elevation of the moveable drive to permit a wide variety of bottles sizes to be processed with only a small change. When the moveable drive carries the pockets and the like, the elevation of that drive with respect to the operating components is adjusted for the length of the bottle. Means for adjusting this dimension permits flexibility of scheduling, and overcome one of the major prior art failures. Also particularly preferred as an embodiment which permits rapid adjustment for changing bottle sizes, is the device in which the bottle holding arms have cam followers, movement of which activates the arms to grip the bottle. The first station includes cams which operate on the cam followers to initiate gripping, while the second station includes cams which operate on the cam followers to release the bottles. By constructing the cam followers to be adjustable, the arms can quickly be adjusted to the size of the bottle. Since the cams themselves are permanently part of the stations, every pocket is subjected to gripping and release. Nevertheless, damage to one pocket does not prevent operation of the device.

BRIEF DESCRIPTION OF THE DRAWINGS

The invention and the various embodiments will be readily understood from the following disclosure and the accompanying drawings, which are presented by way of example and illustration, in which:

FIG. 5 is a schematic sequential flow diagram showing in side elevation, the orientation of the bottle and its associated pocket from an infeed position through bottle orientation detection station, first 180° (go or no go) rotation station, an ionized air cleaning station, second 180° rotation station, discharge to conveyor station, and pocket positioning station prior to indexing with the infeed station.

FIG. 6 is an enlarged fragmentary side elevational view of one of the eight pocket assemblies.

FIG. 7 is a sectional plan view of the pocket assembly shown in FIG. 6 and taken on the line 7—7 of FIG. 6, showing additional details of construction.

FIG. 9 is a transverse sectional view taken on the line 9—9 of FIG. 6.

FIG. 10 is a transverse sectional view taken on the line 10—10 of FIG. 6 showing details of the (go-so go) pocket assembly rotation means.

FIG. 11 is a view similar to FIG. 10, but showing the slip clutch unlatched allowing the sprocket and rack engagement to rotate the pocket assembly 180°.

FIG. 12 is a fragmentary front elevational view of the pocket assembly of FIG. 6, but showing the pocket holding a plastic bottle such as shown in FIG. 13.

FIG. 13 is a semi-schematic view, with some parts deleted for clarity, showing the bottle gripping function as performed by the pocket assembly.

FIG. 14 is a semi-schematic view, with some parts deleted for clarity, showing the bottle release, cam engagement and movement of the gripping fingers outward from the bottle.

FIG. 15 is a semi-schematic view, with some parts deleted for clarity, showing an empty pocket approach to the bottle in feed where the bottle release cam and the lead gripping member retraction cam are engaged.

DESCRIPTION OF THE PREFERRED EMBODIMENT

Figure 1:
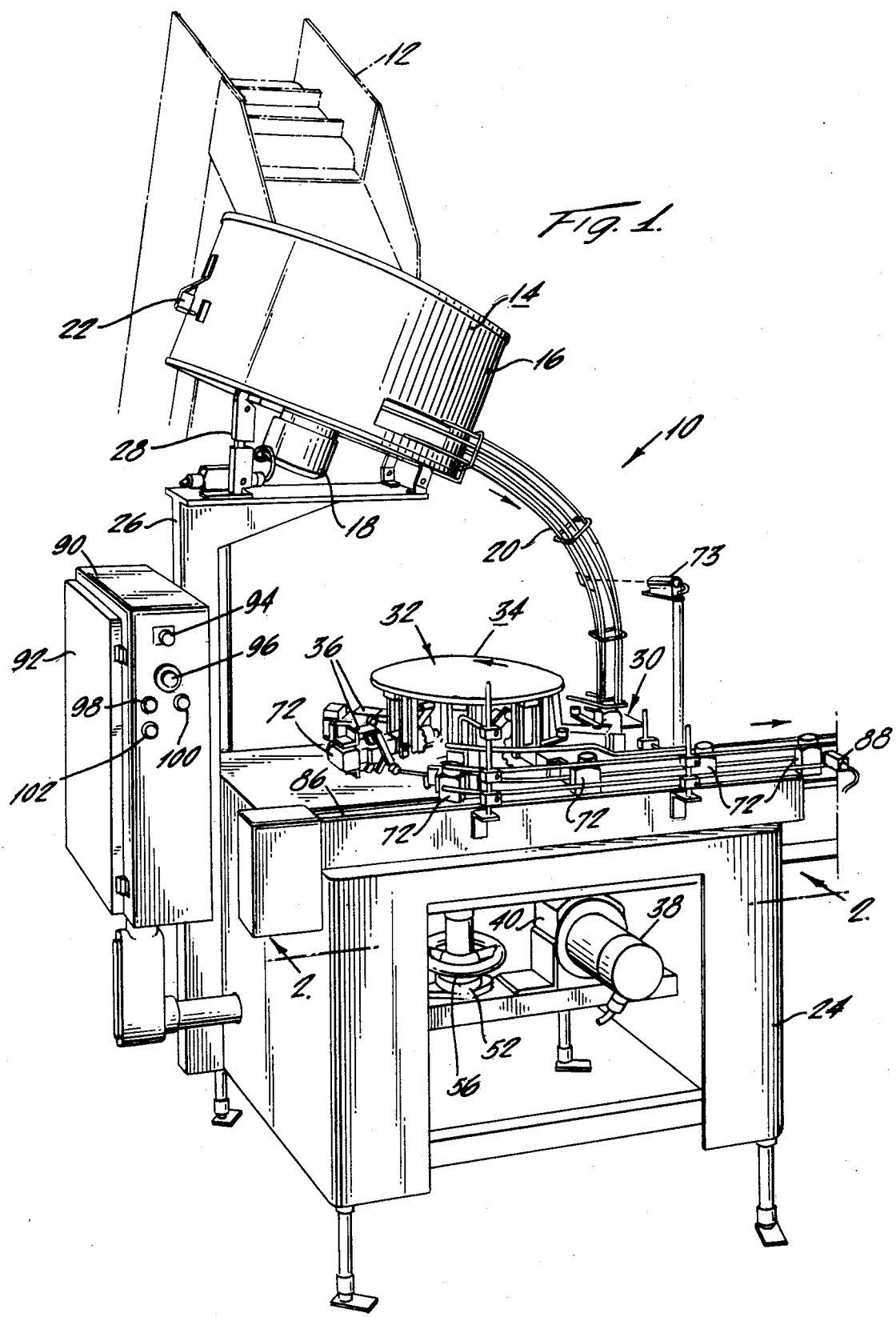
FIG. 1 is a perspective view of the overall system and apparatus of the invention for a bottle unscrambling, cleaning and orienting device.

There is shown in FIG. 1 of the drawings a bottle unscrambling, high pressurized air cleaning and orienting device generally referred to as 10. Empty plastic bottles are drawn from a supply bin, not shown, where they are dumped in a random fashion. They are then delivered to an overhead disc sorter 14, by means of a vertical belt and flight conveyor 12 shown in dot-and-dash outline.

The empty plastic bottles are deposited in a random fashion into the drum 16 of the disc sorter. The disc sorter is a conventional type and includes an internal rotating disc driven by motor 18 that unscrambles the bottles and aligns them axially for tangential discharge into a wire infeed downwardly directed infeed chute 20.

The maximum level of the empty plastic bottles entering the disc sorter 14 is detected by the sensor 22, shutting down the vertical conveyor 12 when a predetermined level of bottles has been reached.

The disc sorter 14 is mounted above bottle orienting mechanism table 24 by means of an attached pedestal 26 terminating in a horizontally extending plate to which one end of the disc sorter is hingedly attached and the other end is provided with adjustment means 28 for tilting the disc sorter 14, to provide the necessary negative angle of discharge for the bottles entering the wire infeed chute 20.

The empty plastic bottles entering the infeed chute 20 are aligned axially but in a random pattern of base to tip orientation condition and are delivered to the infeed station 30 of the orienting apparatus 32 in this manner. The orienting apparatus 32 consists of a counter-clockwise rotating turret 34 having eight pocket assemblies 36 mounted thereon.

Figure 2:
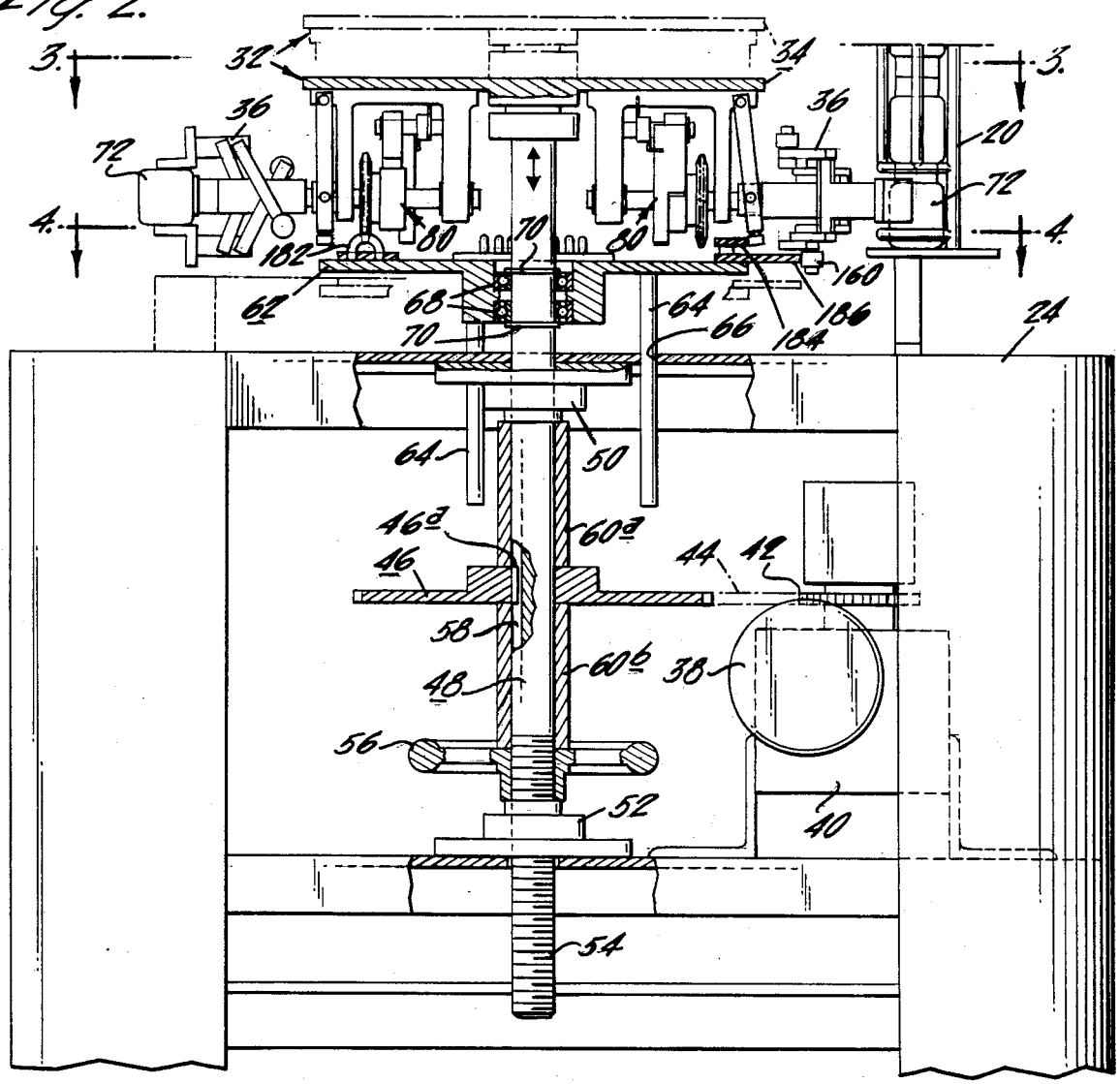
FIG. 2 is a fragmentary enlarged side elevational view with some portions broken away and in section, of the turret drive mechanism and its vertical height adjustment details.

The turret 34 is driven as shown in FIG. 2 by means of an electric motor 38 mounted beneath the table 24, a gear box 40, drive sprocket 42, chain drive 44 and second driven sprocket 46. The sprocket 46 is slidably keyed to the vertically extending main support shaft 48 of the turret assembly. The shaft 48 rotates the turret assembly 34 and its associated pocket assemblies 36 in a counter-clockwise direction. In addition, means are provided for vertically adjusting the turret assembly 34. To this end, the main support shaft of the turret 34 is mounted centrally of the table 24 and carried in upper and lower bearings 50 and 52 respectively. The main drive shaft 48 has at its lower terminal end a threaded portion 54 which coacts with a threaded hand wheel 56, the shaft 48 has in addition a key slot 58 which coacts with the spline 46a of the driven sprocket 46. Spacing sleeves 60a and 60b are placed above and below sprocket 46 respectively. The sleeve 60a, sprocket 46, sleeve 60b, and hand wheel nut 56 are all carried between bearings 50 and 52, mounted to the table 24, so that as hand wheel 56 is rotated and the turret remains stationery, the shaft 48 moves up or down with respect to the table and the sprocket 46 remains in a common plane with disc drive sprocket 42. The upper terminal end of the shaft 48 carries the entire orientation apparatus 32. Since the pockets 36 are carried by the orientation apparatus 32 the central horizontal plane of the pockets 36 may be finely adjusted in a vertical direction to make contact with bottles of varying height and of infeed station wire construction.

The orienting device 32 carried atop the vertical shaft 48 is a layered construction. The uppermost level comprises a rotating circular turret member 34 upon which are mounted 8 equally radially spaced pocket assemblies 36. Directly below the circular rotating turret member 34, and fixedly spaced is a non-rotating deck member 62. Rotation of member 62 is prevented by 3 equally spaced depending rods 64 mounted on the underside of deck member 62 and passing through 3 matching equally spaced apertures 66 in the top deck of table 24. In addition the non-rotating deck member 62 has a central boss carrying bearings 68. The deck 62 is secured to the shaft 48 by means of snap rings 70 spacing the deck 62 from the upper rotating circular turret 34 and allowing rotation of the shaft 48 through the bearings 68.

As the turret turns in a counter-clockwise direction, the pocket assemblies first pick up an empty bottle 72 from a filled chute 20 at the infeed station 30. This condition has been sensed by sensor 73 and ensures that enough bottles are present to fill all eight pocket assemblies 36. If this condition is not met, the machine is shut down. When sufficient bottles are present each pocket assembly 36 picks up an empty plastic bottle at the infeed station. If the bottle 72 is in a bottom down condition as shown in the schematic drawing of FIG. 5, a first pocket assembly 36 will grasp the bottle 72 and move in a counter-clockwise direction. The pocket assembly 36 and the retained bottle 72 pass over a range-sensing orientation detector 74. The sensor 74 will determine if the bottle held in the pocket assembly 36 is oriented in a bottom down or top down condition. If as shown, the bottle is in a bottom down condition, a signal is sent to a logic control system 76 to energize an air activated hydraulic ram 78. This activation releases a pawl restrained friction clutch assembly 80 of the pocket assembly 36, allowing the pocket assembly 36 and retained bottle 72 to be rotated 180° to a bottle top down condition. This first rotation means with its go-no go logic and the details of the pocket assembly 36 will be discussed in detail hereinafter. The bottle is then carried in a bottom down condition over a high pressure ionized air device 82 station. The high pressure ionized air cleaning device 82 is an optional feature and another device such as a bottom printing device, bottle washer, and the like may be required in its place.

The bottle 72 is then carried in a top down condition by the pocket assembly 36 to a second 180° rotation station where the pawl friction clutch member 80 is released by a fixed cam member 84 and the pocket assembly 36 and retained bottle 72 are rotated 180°, restoring the bottle 72 to a bottom down condition. The bottom down condition bottle 72 is then carried by the pocket member 36 over a discharge conveyor means 86 where it is released by the retaining pocket 36 by means discussed more fully later on. The empty pocket 36 retracts its leading gripping finger by means discussed later, just prior to picking up another bottle 72 at the pickup station 30. It should be obvious that if the next bottle is in a top down position when picked up at the infeed station 30 by a pocket assembly 36, this condition will be sensed by passage over the sensor 74, the air hydraulic ram 78 will remain inoperative, and the pocket friction clutch assembly 80 will not be released, resulting in the bottle 72 being carried over the high pressure ionized air device 82 in top down desired condition, the same as in the previous case.

Although the orienting device 32 is described as an endless rotating turret defining a circular path, it should be obvious that the entire sequence can be carried out in a linear path as well. The selection of the shape or dimension of the path is left to the particular needs of those who will ultimately manufacture or purchase the device.

With reference to FIG. 1, as an additional safety feature, a sensor 88 is placed along the line of travel of the bottle 72 due to a shut-down condition upstream of the conveyor. If such a condition is present, the entire orienting device is shut down.

All electrical connections and control circuits are contained within a control box 90 mounted adjacent the left side of the cable 24 and easy access is obtained thereto by means of a door 92. The operator's controls include a power on and off button 94, start and stop button 96, a preorienter drive button 98, a main drive button 100, and an elevator drive button 102.

As a preferred embodiment, a specific pocket assembly 36 and other related details of the turret assembly 30 are shown. With reference to FIG. 6, there is shown a fragmentary side elevational view of one of the eight pocket assemblies. As is conventional, the individual assemblies 36 are constructed in the same manner, and a description of one will suffice for all. Eight pockets are shown, although this number is optional within the scope of the design.

A pocket assembly 36 is suspended from the underside of the rotating turret plate 34 by means of a casting 110. The casting has two downwardly extending leg portins 112 and 114. A Tarrington roller clutch 116 in leg 112 and a Tarrington needle bearing 118 in leg 114 are placed close to the bottom terminal ends of the leg portions. Horizontally extending drive shaft 120 is rotatably supported between needle bearing 118 in leg 114, and the roller clutch 116 in leg 112. The shaft 120 is secured to the bracket 110 by snap rings. A slip clutch and drive sprocket assembly 122 is carried on the drive shaft 120 between the legs 112 and 114. The pitch diameter of the drive sprocket may be changed to accomplish desired pocket turning speeds for bottles of the various sizes. Directly above the drive shaft 120 and axially aligned therewith is a stub shaft 124 whose inner terminal end is fixedly mounted in leg 112. The stub shaft 124 mounts a spring biased pawl 126, comprising a first member stop dog 128, and an adjustable trip arm 130. The stop dogs lower terminal end is held in inner engagement with one of two stops 132 on the slip clutch 122 by spring 134.

Spaced outwardly from the leg 114 and pivotly secured to the outer terminal end of casting 110 by shoulder screws 136 is a cam yoke 138 whose lower terminal end carries a Tarrington cam follower 140. Spacedly mounted about the drive shaft 120 and pivotly held by the cam yoke 138 by shoulder screws 142 is a gripper pusher block 144. A gripper shoulder pin block 146 is slidably mounted on shaft 120, forward of the gripper push block 144. The outermost end of the drive shaft 120 has a front yoke 148 fixedly secured to it. By means of pins 150 a compression spring 158 is mounted on the drive shaft 120 and between the leading edge of the gripper shoulder pin block 146 and the inner edge of the fixed front yoke 148.

Figure 8:
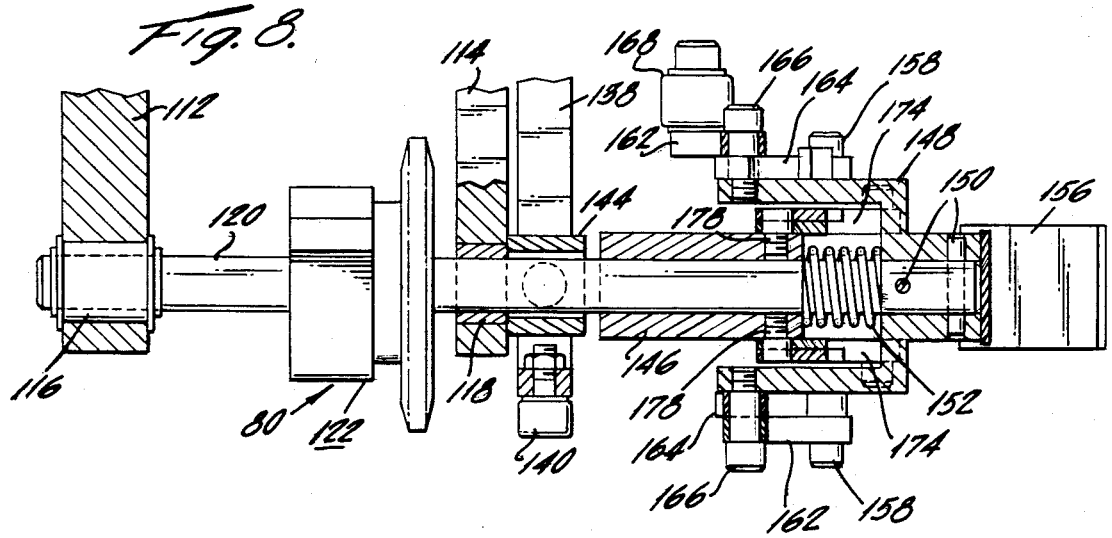
FIG. 8 is a sectional elevational view of the pocket assembly of FIG. 6 taken on the line 8—8 of FIG. 7.

Outwardly and angularly disposed to either side of the front yoke 148 are two idential pivot arms 154 carrying two gripping fingers 156 on their outer terminal ends. The inner terminal ends of the pivot arms are pivotly connected by means of shoulder bolts 158 and pivot pins 160 to two pairs of links, comprising a cam retracting link 162 and a retracting link 164. Each pair are pivotly connected by means of shoulder bolts 164 to the inner end of front yoke 148. Each of the cam retracting links 162, have cam followers 168 mounted on their outer ends. Two vertical shafts 170 extend between the upper and lower pairs of retracting links. One shaft 170 is on each side of the front yoke 148. Each shaft 170 carries a pair of springs 172. The springs 172 bias the pivot arms 154 into a forwardly directed angularly converging condition so that in a rest condition, the gripping fingers 156 are urged against either side of the front yoke 148, as shown in FIG. 7. The inwardly directed angularly converging condition of the pivot arms 154 and associated gripping fingers 156 is created not only by springs but by pairs of gripping links 174. These links 174 have outer ends pivotally secured to pivot arms 154 by shoulder bolts 176 and inner terminal ends pivotally tied together and secured to the outer end of the gripper shoulder pin block 146 by shoulder bolts 178, as shown in FIG. 8.

Figure 4:
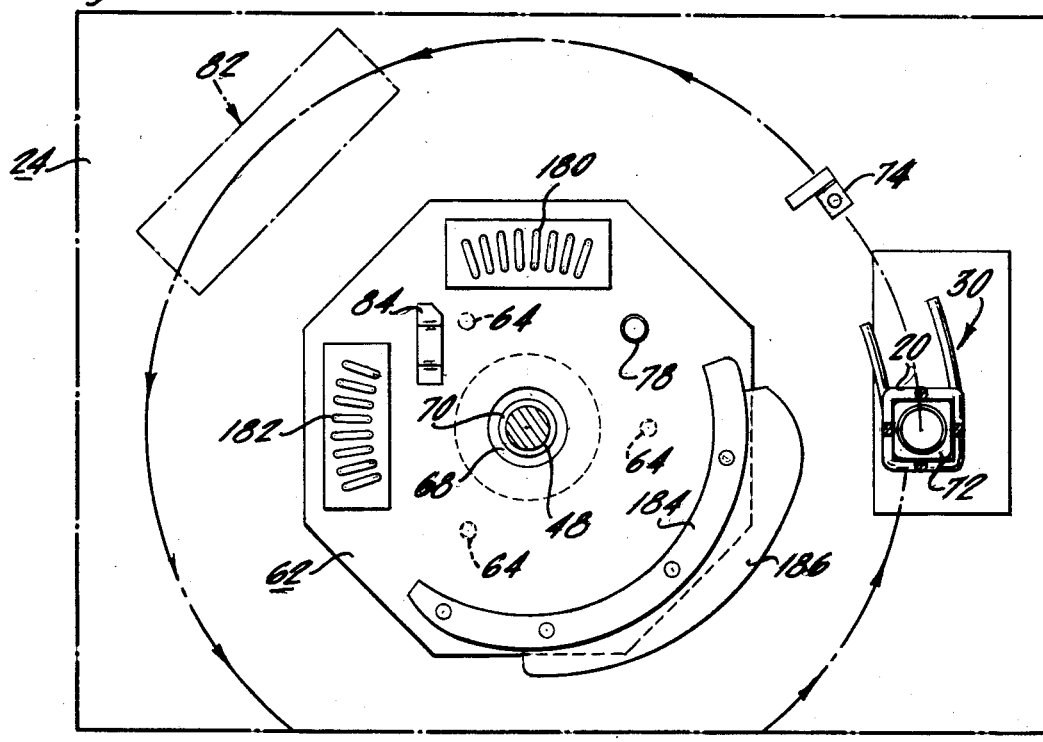
FIG. 4 is a fragmentary sectional plan view taken on the line 4—4 of FIG. 2, showing details of the nonrotatable platen of the turret assembly that supports the gear rack, cam tracks, hydraulic cylinder and fixed blade trip mechanism. Also shown mounted to the frame and underlying a dot-anddash circular bottle path the infeed station, the ranging detection sensor and in dot-and-dash a rectangular box that shows the general location of an ionized air cleaning device.

As previously stated, the pocket assemblies 36 lie in a plane intermediate the plane of the upper turret plate 34 and the non-rotating deck member 62. With reference to FIG. 4, the non-rotating deck 62 carries the air actuated ram 78 upon its lower surface and a first rack 180, a cam blade 84, a second rack 182 and two cam surfaces, an inner and upper cam track 184 and a lower and outer cam track 186 on the upper surface of deck 62.

The pocket assemblies 36 have their gripping fingers 156 in an inoperative and empty condition in the position shown in FIG. 7. From the 1:00 o'clock position counter-clockwise to the 7:00 o'clock position, and then from the 6:00 o'clock position to the 3:00 o'clock position, the gripping fingers 156 assume the positions shown on FIGS. 14 and 15 respectively.

In operation it will suffice to explain the operation and motions of one pocket assembly 36 in its counter-clockwise rotation from the infeed station 30 through 360° of rotation, since all pocket assemblies perform the same functions in sequence through the 360° of rotation.

Figure 3:
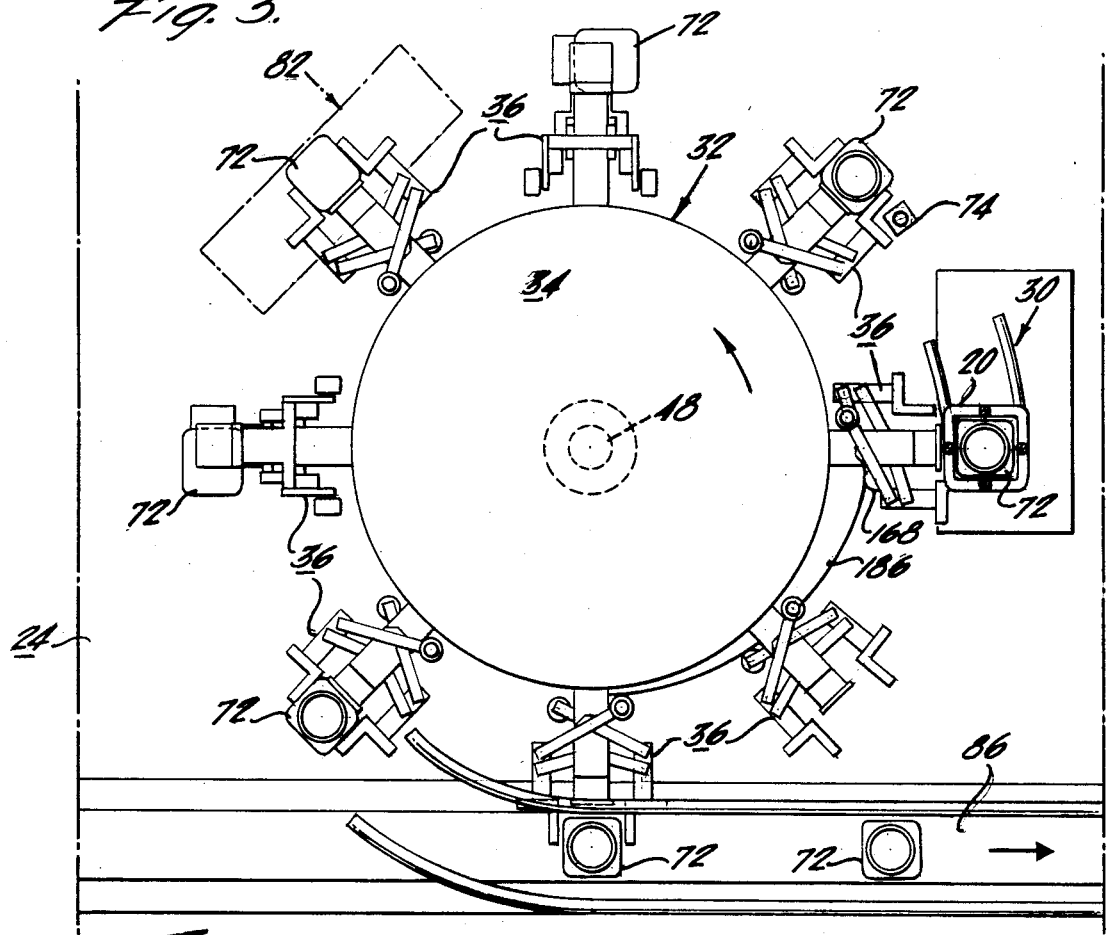
FIG. 3 is a fragmentary plan view of the rotatable turret and its associated pocket assemblies taken on the line 3—3 of FIG. 2, showing also the relative positions of the 8 radially spaced pockets and bottles from the infeed station through intermediate stations in a counter-clockwise direction to the discharge station overlying a discharge conveyor.

With a pocket assembly 36 in an indexing position wiht respect to the infeed station 30 as shown in FIGS. 2, 3 and 5, it will be noted that the cam track 186 is in engagement with the cam follower 168 of the pocket assembly 36. The lead pivot arm 154 and associated lead gripping finger 156 are displaced inwardly out of any path of engagement with the bottle 72 to be picked up by the pocket assembly 36 through the retraction links 162 and 164. In this position the gripping fingers and pivot arms are in an opened condition due to the engagement of the cam follower 140 with the cam track 184. This engagement causes the gripper push block 144 to move against the gripper shoulder pin block 146, deurging the pin block forwardly against the compression return spring 152 to move the pivot arms 154 and associated gripping fingers 136 through gripping links 174 outwardly to an opened condition shown in FIG. 3 and FIG. 15 of the drawings.

As the pocket assembly 36 proceeds to move in a counter-clockwise direction, the trailing gripping finger 156 contacts the bottle 72 at the infeed station and wipes the bottle free of station 30. Wire guides move the bottle inwardly toward the gripping fingers 156. As the cam followers 140 and 168 are removed from engagement with cam tracks 134 and 136, the lead gripping finger 156 moves outwardly toward the bottle 72 and then the gripping fingers are brought into gripping engagement with the bottle sides. The bottle is carried over the ranging sensor 74 as described before with reference to FIG. 5. With the bottle 72 in a bottom down condition, the hydraulic ram 78 actuator is energized upwardly into the path of the trip arm 130 of the pocket assembly 36, as shown in dot-and-dash lines in FIG. 10. This causes the stop dog 128 out of engagement with a stop 132 on the slip clutch and drive sprocket assembly 122. The sprocket then engages a first rack 180 and rotates the shaft and associated pocket assembly and bottle 72 through 180° to invert the condition of the bottle.

FIG. 11 illustrates some intermediate point of rotation and shows the stop dog 128 in a returned position to engage the 2nd stop 132 of the slip clutch 122 when the pocket assembly has rotated exactly 180°. Continued rotation of the pocket assembly 36 and inverted bottle in a top down condition passes the open mouth of the bottle 72 over the high pressure ionized air cleaning device 82. The pocket assembly 36 and bottle 72 are then rotated to a second 180° rotation station. At this station the trip arm 130 engages a fixed cam 84 mounted to the deck 62, again disengaging the stop dog 128 and allowing the slip clutch and sprocket assembly 122 to be rotated an additional 180° when in engagement with the second rack 182, thereby righting the bottle 72 and pocket assembly 36 to its original bottom down condition.

It should be noted that if the bottle 72 is in a top down position when presented to the pocket assembly 36 at the infeed station 30, the sensor 74 will detect this condition and ram 78 will not be energized. The slip clutch will be held against rotation by the stop dog 128, as will the drive shaft 120, pocket assembly 36 and bottle 72. However, the sprocket of the slip clutch assembly 122 will be free to rotate over the rack 180. It should also be noted that the clutch 116 allows rotation of the pocket assembly 36 in one direction only.

The pocket assembly 36 and bottle 72 continue to rotate toward an output conveyor 86 as the pocket assembly 36 passes the bottle over the edge of the conveyor 86, the cam follower 140 of the pocket assembly engages the cam track 184 (FIG. 14), causing the gripping fingers 156 to release the bottle 72. Also wire guide means tend to wipe the bottle 72 outwardly away from the gripping fingers 156 and position the bottle 72 along the center line of conveyor 86.

The empty pocket assembly continues to rotate toward the infeed station 30 and the cam follower 168 comes into engagement with the cam track 186 causing the lead gripping finger 156 to retract inwardly and assume a condition illustrated in FIG. 15.

It will be understood, of course, that the foregoing is for illustration of the invention, and that various changes and modifications may be made without departing from the spirit and scope of the invention.

Having thus described the invention, what is claimed is:

1. A bottle orienting device, comprising: feed means for delivering bottles of random orientation from a source; a first station for receiving bottles from said feed means, and presenting said bottles in either a top down condition or a bottom down condition as received; bottle transport means for holding each bottle, and including means for transporting said bottle along a predetermined path; ranging sensor means positioned on said path for determining the positioned condition of said bottle, either top or bottom down and to selectively generate a signal when said bottle is in a first preselected condition; first rotating means positioned on said path after said sensor means, and operably connected to change the condition of said bottle upon receipt of said signal from said sensor means by rotation about a horizontal axis; second rotation means positioned on said path after said first rotation means, and operably connected to change the rotated positional condition of said bottle to the preselected condition; and second station means for receiving bottles from said bottle transport means, and positioned to discharge said bottles from said device, said bottle transport means including a moveable drive means carrying a plurality of individual pocket means thereon and positioned to transport said pocket means sequentially from said first station along said predetermined path, each of said individual pocket means including bottle carrying arms for carrying said bottle when said individual pocket means passes said first station and includes condition holding means for holding said bottle in its orientation condition, said first rotationmeans including a sensor responsive deactivation means for contacting said individual pocket means in response to said selectively generated signal to deactivate said condition holding means during change of said condition of said bottle.

2. The device of claim 1, wherein said first rotation means includes a first condition altering means for contacting said condition holding means to selectively change the condition of bottles carried by pockets contacted by said deactivation means and not change the condition of bottles carried by pockets not contacted by said deactivation means.

3. The device of claim 2, wherein said second rotation means includes second deactivation means for contacting every individual pocket means to deactivate said condition holding means, and second condition altering means for changing the condition of bottles carried by every individual pocket means, and thereafter reactivate each of said condition holding means.

4. A bottle orienting device, comprising: feed means for delivering bottles of random orientation from a source; a first station for receiving bottles in either a top down condition or a bottom down condition; a moveable drive means carrying a plurality of individual pocket means therein, and positioned to transport said pockets sequentially from said first station along an endless predetermined path, each of said individual pocket means including bottle holding arms for engaging sid bottle when said individual pocket means passes said first station, and including condition holding means for holding said bottle in its orientation condition; first sensor means positioned on said path after said first station for sensing the condition of the bottle carried by each individual pocket means as it passes said sensor, said sensor selectively generating a signal when said passing bottle is in a preselected condition and not generating a signal when said passing bottle is in the other condition; sensor responsive first deactivation means positioned on said path after said sensor means for contacting said individual pocket means in response to said selectively generated signal to deactivate said condition holding means for those pocket means generating said signal; first condition altering means positioned in said path after said deactivation means for contacting said condition holding means to selectively change the condition of bottles carried by pockets contacted by said deactivation means and not change the condition of bottles carried by pockets not contacted by said deactivation means, said altering means further including means to reactivate said condition holding means in said individual pocket means after changing said condition; second deactivation means positioned on said path after first deactivation means for contacting every individual pocket means to deactivate said condition holding means in said pocket means; second condition altering means positioned on said path after said second deactivation means for changing the condition of bottles carried by every individual pocket means, and thereafter reactivate said condition holding means in each individual pocket means; and a second station for receiving bottles from said individual pocket means and having release means for releasing said bottle carrying arms and said condition holding means, whereby said bottles are discharged from said device in said preselected condition.

5. The device of claim 4 which further includes means for operating on said bottles to accomplish a process operation when said bottles are between said first condition altering means and said second condition altering means on said path.

6. The device of claim 5 wherein said process operation includes air cleaning the insides of said bottles.

7. The device of claim 4, which further includes means for adjusting the elevation of said moveable drive to thereby adjust the position of said bottle holding arms in a verticle direction for various bottle sizes.

8. The device of claim 4, where said preselected condition is the bottom down condition, to thereby place all bottles in the bottom down condition for discharge by said second station.

9. The device of claim 4, wherein said bottle holding arms having cam followers mounted thereon, and said first station includes cam means positioned to contact said cam followers to cause said arms to hold said bottle.

10. The device of claim 9, wherein said second station includes cam means positioned to contact said cam followers to cause said arms to release said bottle.

11. The device of claim 4 wherein said predetermined path is circular.

12. The device of claim 4, wherein said condition holding means includes a shaft holding said pocket and a clutch means preventing rotation of said shaft, said clutch means including a trip arm adjacent a clutch stop for preventing rotation of said clutch; and said first and second deactivation means include cam means for activating said arm to release said clutch stop and permit rotation of said clutch.

13. The device of claim 12, wherein said condition altering means include gear and rack means for cooperatively rotating said shaft 180° to thereby rotate the pocket and reverse the condition of said bottle.

14. A bottle orienting device, comprising: feed means (14) for delivering bottles of random orientation from a source; a first station (30) for receiving bottles from said feed means (14), and presenting said bottles in either a top down condition or a bottom down condition as received from said bottle feed means (14); bottle transport means (34) for holding each bottle, and including means for transporting said bottle along a predetermined path; ranging sensor means (74) positioned beneath said path for determining the condition of said bottle, either top or bottom down, and to generate a signal indicating whether said bottle is in a bottom down or top down condition; first rotating means (78) positioned along said path after said sensor means (74), and operably connected to change the condition of said bottle from a bottom down to a top down condition upon the receipt of an appropriate ranging signal from said first sensor means; second rotation means (84) positioned along said path subsequent said first rotation means, and operably connected to change the rotary position of said bottles from top down to bottom down position; and a bottle discharge station including cams (184) and (186) for releasing bottles from the transport means (36) onto a discharge conveying means (86), said bottle transport means including a movable drive means carrying a plurality of individual pocket means thereon and positioned to transport said pocket means sequentially from said first station along said predetermined path, each of said individual pocket means including bottle carrying arms for carrying said bottle when said individual pocket means passes said first station and includes condition holding means for holding said bottle in its oriented condition, said first rotation means including a ranging sensor responsive deactivation means for contacting said individual pocket means in response to said selectively generated signal to deactivate said condition holding means during change of said condition of said bottle.

15. The device of claim 14, wherein said first rotation means includes a first condition altering means for contacting said condition holding means to selectively change the condition of bottles carried by pockets contacted by said deactivation means and not change the condition of bottles carried by pockets not contacted by said deactivation means.

16. The device of claim 15 wherein said second rotation means includes second deactivation means for contacting every individual pocket means to deactivate said condition holding means, and second condition altering means for changing the condition of bottles carried by every individual pocket means, and thereafter reactivate each of said condition holding means.

17. A bottle orienting device (14), comprising: feed means (20) for delivering bottles of random but axial orientation from a source; a first station (30) for receiving bottles in either a top down condition or a bottom down condition; a movable drive means carrying a plurality of individual pockets (36) therein, and positioned to transport said pockets (36) sequentially from the first station (30) along an endless predetermined path, each of said individual pockets (36) including bottle hold arms and side clamping means (156) for engaging said bottle (72) when said individual pockets (36) pass said first station (30), and including rotary position holding means (116) for holding said bottle in its rotated oriented positon; first sensor means (74) positioned on and beneath said path of bottles after said first station (30) for sensing the condition of the bottle carried by each individual pocket (36) as it passes said sensor (74), said sensor (74) selectively generating a signal when said passing bottle is in a bottom down or top down position, sensor (74) responsive first deactivation means (78) on the path after said sensor (74) for contacting said pockets (36), in response to said selectively generated signal to deactivate from sensor (74) said condition holding means (80) for those pockets (36) generating bottle down signal; first bottom down altering means (180) positioned in said path after said deactivation means (78) for contacting said condition holding means (80) to selectively change the bottom down condition of bottles carried by pockets (36) contacted by said deactivation means (78) and not to change the condition of bottles detected by sensor (74) in a top down position carried by pockets (36) and not contacted by said deactivation means (78), said altering means further including means to return to a bottle down position; second deactivation means (84) positioned on said path after said first deactivation means (78) for contacting every individual pocket (36); second condition altering means (182) positioned on said path after said second deactivation means (84) for changing the condition of bottles carried by every individual pocket (36) and thereafter rotate to a bottom down condition holding means in each individual pocket (36); and a discharge station for receiving bottles (72) from said individual pockets (36) and having release means for releasing said bottle (72) carrying arms, whereby said bottles are discharged from said individual pockets (36) in a bottom down position onto conveyor (86).

* * * * *